(12) United States Patent
Farell

(10) Patent No.: US 9,534,941 B2
(45) Date of Patent: Jan. 3, 2017

(54) BAR GRAPH IMPLEMENTATION WITH A PADDLE-STYLE POINTER

(71) Applicant: James Paul Farell, Canton, MI (US)

(72) Inventor: James Paul Farell, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 119 days.

(21) Appl. No.: 14/465,479

(22) Filed: Aug. 21, 2014

(65) Prior Publication Data

US 2016/0054155 A1     Feb. 25, 2016

(51) Int. Cl.
*G01D 13/22* (2006.01)
*B60K 37/02* (2006.01)

(52) U.S. Cl.
CPC ............... *G01D 13/22* (2013.01); *B60K 37/02* (2013.01); *B60K 2350/1064* (2013.01); *B60K 2350/206* (2013.01)

(58) Field of Classification Search
CPC . G01D 13/22; G01D 11/28; B60K 2350/1064; B60K 2350/206; B60K 37/02
USPC .......................................... 116/200, 300–305
See application file for complete search history.

(56) References Cited

U.S. PATENT DOCUMENTS

| | | | |
|---|---|---|---|
| 531,669 A | 1/1895 | Weston | |
| 1,121,486 A | 12/1914 | Evans | |
| 1,885,629 A * | 11/1932 | Rich ........................ | G01F 23/16 116/227 |
| 1,956,092 A | 4/1934 | Ewald | |
| 1,999,073 A | 4/1935 | Awrey | |
| 2,085,345 A | 6/1937 | Tuttle et al. | |
| 2,123,376 A * | 7/1938 | Moeger .................. | B60K 37/02 116/300 |
| 2,520,028 A * | 8/1950 | Biskind ..................... | G01P 1/11 116/202 |
| 2,585,565 A | 2/1952 | Luck | |
| 2,603,129 A | 7/1952 | Dreyer | |
| 2,885,994 A * | 5/1959 | Butera ...................... | G01B 3/22 116/316 |
| 2,976,674 A * | 3/1961 | Haydon ............... | G04B 19/042 116/301 |
| 3,152,437 A * | 10/1964 | Vasselli ................ | G04B 19/264 116/286 |
| 3,262,416 A | 7/1966 | Nichinson | |
| 3,276,418 A * | 10/1966 | Harris ....................... | G01P 1/08 116/334 |
| 3,915,007 A * | 10/1975 | Johanson ................. | G01O 5/06 116/298 |

(Continued)

FOREIGN PATENT DOCUMENTS

| | | |
|---|---|---|
| CH | 130186 | 11/1928 |
| CN | 102869958 | 1/2013 |

(Continued)

*Primary Examiner* — R. A. Smith
*Assistant Examiner* — Tania Courson
(74) *Attorney, Agent, or Firm* — Dickinson Wright PLLC

(57) ABSTRACT

A pointer device, an instrument cluster, and a display for an instrument cluster are described herein. The pointer device includes a pointer with a stem and paddle. The instrument cluster includes a technique to display a bar graph based interface with a mechanically driven pointer. The display allows for a dual representation employing multiple pointers, with one pointer dedicated to a dial-based display, and another pointer dedicated to a bar graph display.

1 Claim, 5 Drawing Sheets

(56) References Cited

U.S. PATENT DOCUMENTS

| | | | | |
|---|---|---|---|---|
| 4,095,553 | A * | 6/1978 | Ono | G01P 1/11 116/62.3 |
| 4,633,803 | A * | 1/1987 | Flowers | G01D 13/02 116/303 |
| 5,214,624 | A * | 5/1993 | Siebrasse | G04B 19/00 368/239 |
| 5,259,333 | A * | 11/1993 | Iino | B60K 35/00 116/284 |
| 5,554,970 | A * | 9/1996 | Mottahedeh | B60Q 1/54 340/441 |
| 5,627,510 | A * | 5/1997 | Yuan | B60Q 9/008 180/271 |
| 5,983,827 | A | 11/1999 | Cookingham et al. | |
| 6,140,917 | A * | 10/2000 | Branson | G01D 13/12 340/441 |
| 6,310,544 | B1 * | 10/2001 | Cohen | G01D 13/26 116/334 |
| 6,557,485 | B1 | 5/2003 | Sauter | |
| 6,925,959 | B2 * | 8/2005 | Wehner | B60K 35/00 116/286 |
| 7,506,607 | B2 | 3/2009 | Takato | |
| 7,587,987 | B2 * | 9/2009 | Takato | B60K 35/00 116/300 |
| 9,182,254 | B2 * | 11/2015 | Denise | B60K 35/00 |
| 2005/0103254 | A1 | 5/2005 | Birman et al. | |
| 2007/0252684 | A1 | 11/2007 | Fournier et al. | |
| 2010/0289637 | A1 * | 11/2010 | Ewers | B60K 37/02 340/488 |
| 2012/0247385 | A1 * | 10/2012 | Cook | G01D 13/265 116/286 |
| 2013/0076498 | A1 * | 3/2013 | Suess | B60K 35/00 340/438 |
| 2013/0092078 | A1 | 4/2013 | Denise | |
| 2014/0049938 | A1 * | 2/2014 | Farell | B60K 37/02 362/23.07 |

FOREIGN PATENT DOCUMENTS

| | | |
|---|---|---|
| DE | 923510 | 2/1955 |
| FR | 1112164 | 3/1956 |
| JP | 55-118116 | 8/1980 |
| JP | 2010-217013 | 9/2010 |
| JP | 2012-168200 | 9/2012 |
| JP | 2013-528789 A | 7/2013 |

* cited by examiner

BAR GRAPH IMPLEMENTATION WITH A PADDLE-STYLE POINTER

BACKGROUND

Vehicles, such as automobiles, may be equipped with an instrument panel. The instrument panel may provide the operator with useful information for operating and driving the vehicle. The instrument panel may indicate the speed of the vehicle, the revolutions-per-minute (RPM) of the vehicle's engine, a present state of the lighting, a present state of the windshield wipers, for example. The instrument panel may employ mechanical gauges, digital displays, or a combination thereof to convey information about the status of the vehicle.

Instrument panels may be embedded or placed in the dashboard of the vehicle. This ensures that the instrument panel is in a line of sight for the vehicle's driver. Thus, the vehicle's driver may view the road while safely glancing at the instrument panel to obtain useful information for aiding in the operation of the vehicle. The instrument panel's placement is static, and thus fixed in a specific location.

The gauges of the instrument panel may be implemented with mechanical pointers, or digital displays, or combinations of both. A mechanical pointer is anchored at a pivot point, and driven by a motor (for example a stepper motor) in a 360 degree fashion. Based on the current employed to drive the motor, or control signals, the motor may move the mechanical pointer in a clockwise or counter-clockwise fashion. The mechanical pointer is conventionally longer in the direction in which the mechanical pointer is pointing at.

The gauges in which a mechanical pointer may be implemented with are numerous. In one common implementation, the mechanical pointer is implemented with a fuel gauge, which essentially indicates the status of a fuel tank.

FIG. 1(a) illustrates an example mechanical gauge 100 according to a conventional implementation.

The mechanical gauge 100 has a visible portion 110 and a non-visible portion 120. The visible portion 110 is situated with indicia 150 indicating the various states of available fuel. A pointer 160 rotates around a pivot 161. The pointer 160 is driven by a motor 130 that receives a reading of the available fuel from the vehicle, for example, by the fuel sensor 140. The pointer 160 is driven to the corresponding indicia 150 point to reflect the current status of available fuel.

In recent times, other techniques for indicating a vehicular status have also been implemented. FIG. 1(b) illustrates an example of a digital gauge 170 according to a conventional implementation.

Digital gauge 170 may be any sort of implementable visual system installed in a vehicle instrument cluster. For example, the digital gauge 170 may be implemented via a TFT, LCD, LED, or any other display technology known to one of ordinary skill in the art.

The digital gauge 170 includes a shaded portion 180 and a non-shaded portion 190. These portions change as the fuel sensor 140 provides an updated reading associated with the available fuel. As described with the mechanical gauge 100, indicia 150 is provided as well. The indicia serve a similar function of providing an indication of the available amount of fuel.

SUMMARY

A pointer device includes a stem; a pivot portion integrally attached to a first side of the stem, and equipped to attach to a pointer driving mechanism; and a paddle attached to a second side of the stem, and the paddle is wider than stem in a first direction.

An instrument cluster includes a first gauge driven by a concentric dual stepper motor; a second gauge driven by a concentric dual stepper motor; a bar graph display portion; and the second gauge includes a pointer to reflect a measurement via the bar graph display portion.

An instrument cluster display includes a first portion with a dial-based display; a second portion with a bar graph display; and the first portion and the second portion are each provided with a mechanically rotatable elements to indicate a present status.

DESCRIPTION OF THE DRAWINGS

The detailed description refers to the following drawings, in which like numerals refer to like items, and in which.

DETAILED DESCRIPTION

Figure 1A:
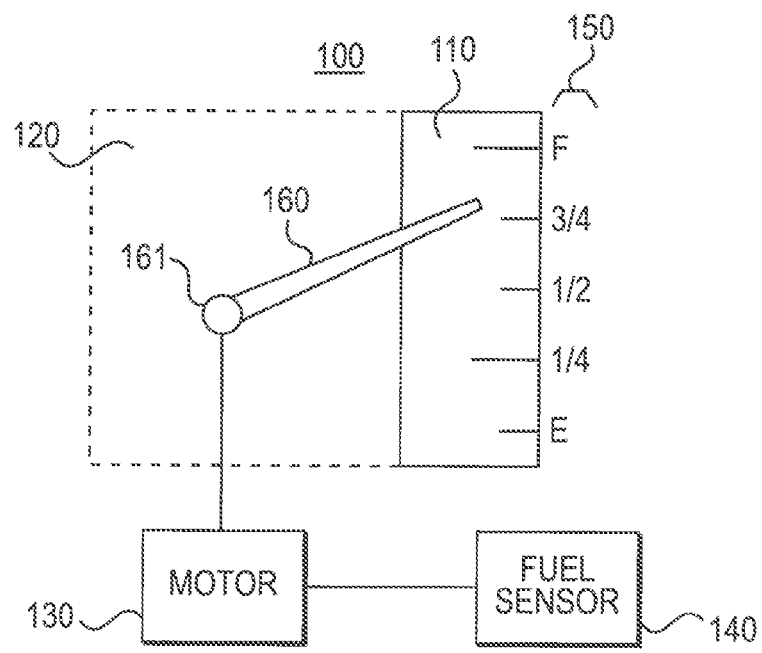
FIGS. 1(a) and (b) illustrate an example mechanical gauge and a digital gauge according to a conventional implementation.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained in the Background section, various gauge implementations may be employed in an instrument cluster. Conventionally, the gauges have been implemented via the mechanical gauge 100 discussed above. In recent times, digital gauges 170 are becoming more common.

Figure 1B:
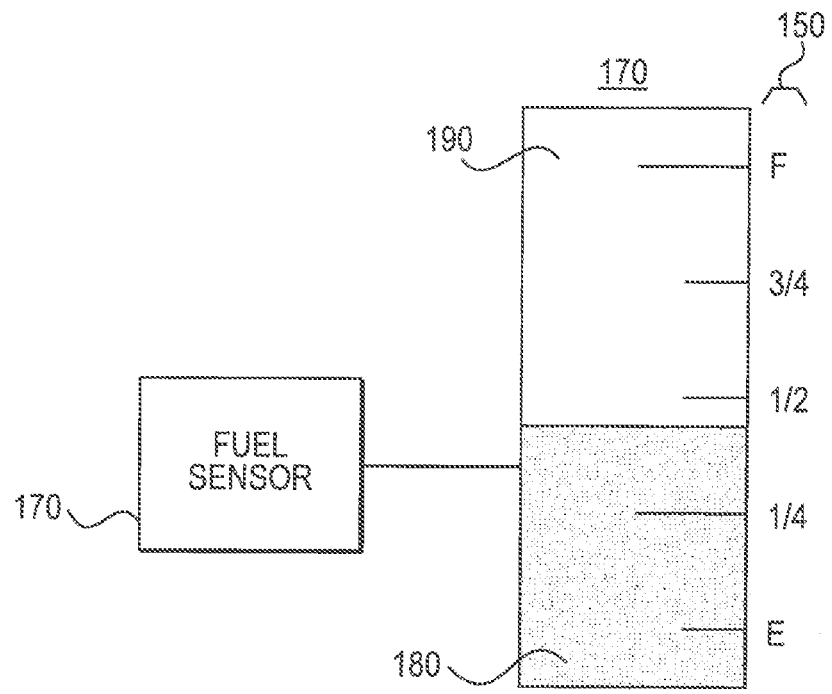

However, one disadvantage with a digital gauge 170 is that it may be cost prohibitive to implement. Digital gauges 170 require implementing a display system in an instrument cluster. This implementation may be expensive, and complicated—especially if all the other elements in the instrument cluster are mechanical. Thus, although a consumer or a group of consumers may prefer a bar graph presentation (as shown in FIG. 1(b))—the implementation may be frustrated due to cost and complexity.

Disclosed herein is a bar graph implementation with a paddle-style pointer. By employing the aspects disclosed herein, an instrument cluster may realize a fully mechanical implementation, while presenting the information in a manner customarily reserved for digital representations of information. Thus, a manufacturer of consumer electronics may provide a more aesthetically pleasing interface, while achieving cost savings and an easier implementation.

Figure 2:
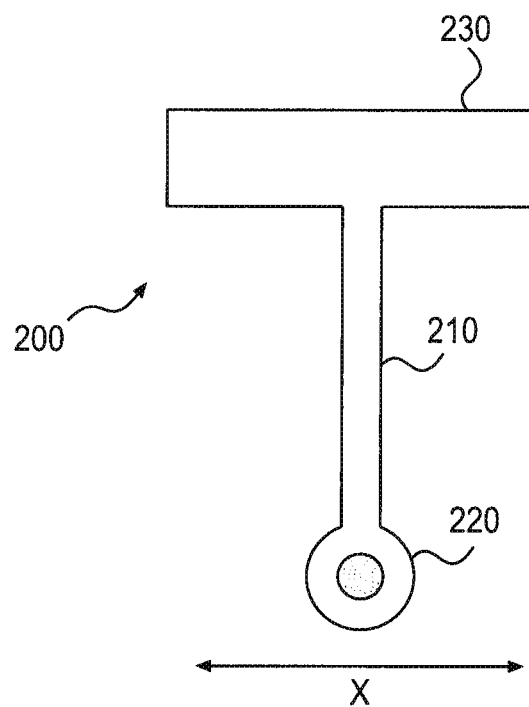
FIG. 2 is an example of a pointer device according to an embodiment disclosed herein.
Figure 2:
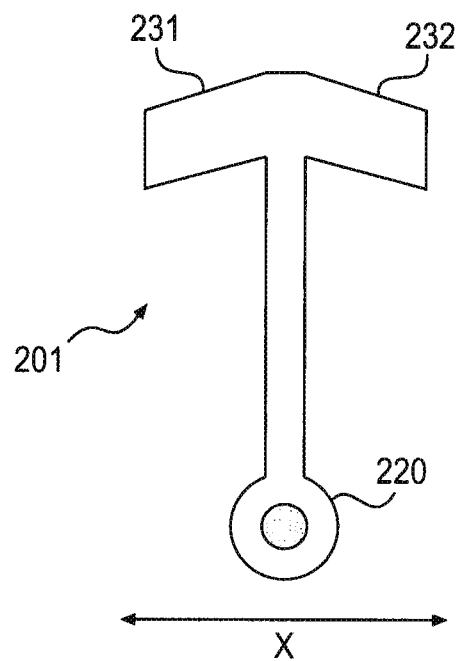

FIG. 2 is an example of a pointer device 200 according to an embodiment disclosed herein. The pointer device 200 is shown as a stand-alone device, however, as explained in detail in other portions of this disclosure, the pointer device 200 may be implemented with various interfaces and instrument clusters disclosed herein.

The pointer device 200 includes a stem 210, a pivot 220, and a paddle 230. The pointer device 200 may be implemented with various materials known to one of ordinary skill in the art in pointer manufacturing.

The pivot 220 is configured to attach to a rotatable driving element, for example a stepper motor. Thus, when the pivot 220 is bolted on to the driving element, the pivot 220 may facilitate a motion in a clockwise or counter-clockwise fashion.

The stem 210 is similar to stems employed with conventional pointer devices. The stem 210 may be longer in the direction in which the pointer device 200 is pointing towards.

On the edge of the stem, on a side directly opposite of the pivot 220, is a paddle 230. The paddle 230 is a substantially rectangular shaped extension of the stem 210. The paddle 230 may be attached separately to the stem 210, or integrally formed with the stem 210 (as shown).

As shown, the paddle 230 is rectangular. However, other shapes and sizes may be implemented, such as two substantially rectangular portions 231 and 232 as shown in a second version of the pointer device 201.

In both examples, the paddles 230 (or 231/232) are significantly longer in the X direction shown.

Figure 3:
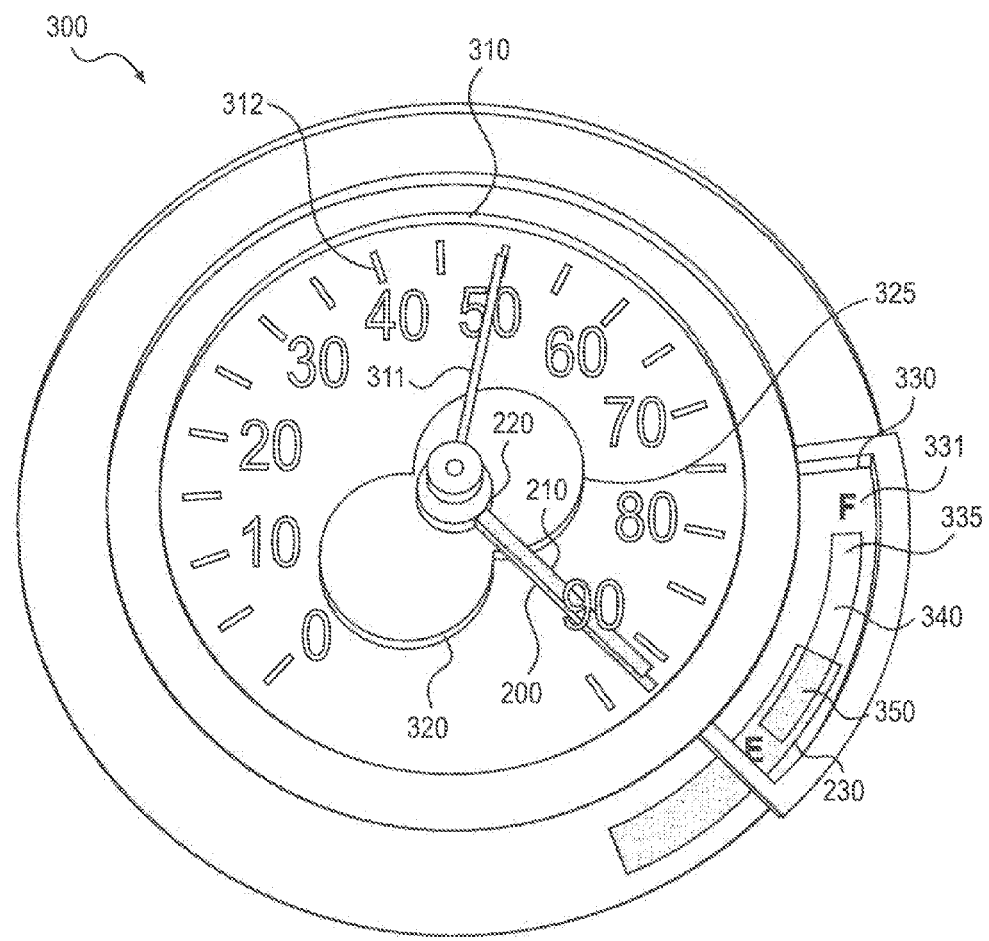
FIG. 3 illustrates an example of an instrument cluster portion incorporating the pointer according to an exemplary embodiment.

FIG. 3 illustrates an example of an instrument cluster portion 300 incorporating the pointer 200 according to an exemplary embodiment. Referring to FIG. 3, the instrument cluster portion 300 is shown without an applique, thereby allowing the internal portions of the instrument cluster portion 300 to be shown. The instrument cluster portion 300 includes a speedometer 310 and a fuel gauge 330.

The speedometer 310 includes a pointer 311 and indicia 312. The speedometer is coupled to a speed sensor associated with the vehicle, and a motor associated with a concentric dual stepper motor 320 is configured to control the pointer 311 based on the present speed of the vehicle.

The fuel gauge 330 includes indicia 331, and a bar graph opening 335. The bar graph opening 335 includes a transparent window to allow an operator of the vehicle to observe the present status of the fuel supply. As shown in FIG. 3, the bar graph opening 335 has a portion that is not populated with any sort of portion of the paddle (340) and a portion that is (350).

The concentric dual stepper motor 320 is also configured to rotate the pointer 200 based on the available fuel supply. Thus, if the fuel supply is increased, the pointer 200 is rotated in a counter-clockwise manner, thereby increasing the space devoted to portion 350, and decreasing the space devoted to portion 340. Conversely, if the fuel supply is lessened, the opposite occurs.

Figure 4A:
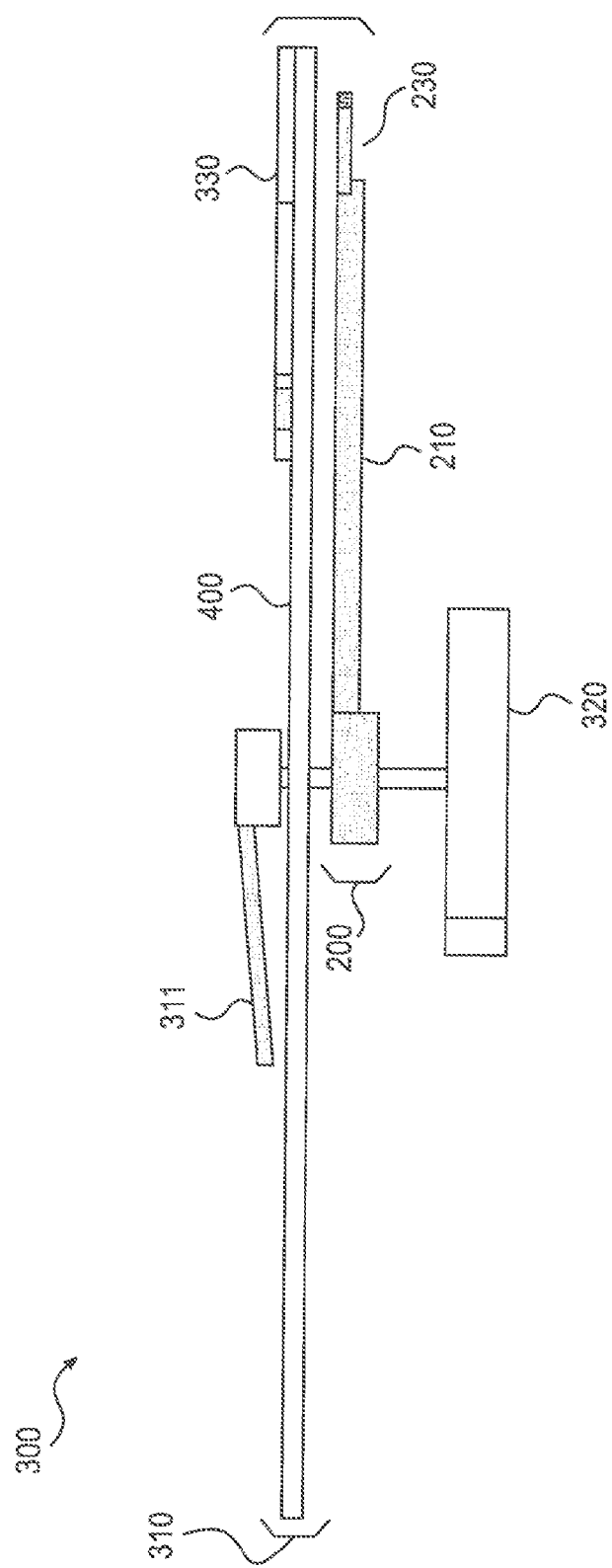
FIGS. 4(a) and (b) illustrate an example side-view and front-view of the instrument cluster portion with an applique.

FIGS. 4(a) and (b) illustrate an example side-view and front-view of the instrument cluster portion 300 with an applique 400. An applique 400 is a paint that covers the transparent portions or plastic portions of an instrument cluster. The applique 400 is a finishing layer, and prevents the operator from seeing anything on the instrument cluster portion 400 other than the indicia 312 and 331, and the elements place above the applique 400, on a surface opposing the vehicle's operator or passenger.

As shown in FIG. 4(a), the pointer 311 is situated on top of the applique 400. This allows the vehicle's operator and passenger to view the pointer 311 as it gets adjusted to conform with a current speed of the vehicle.

Figure 4B:
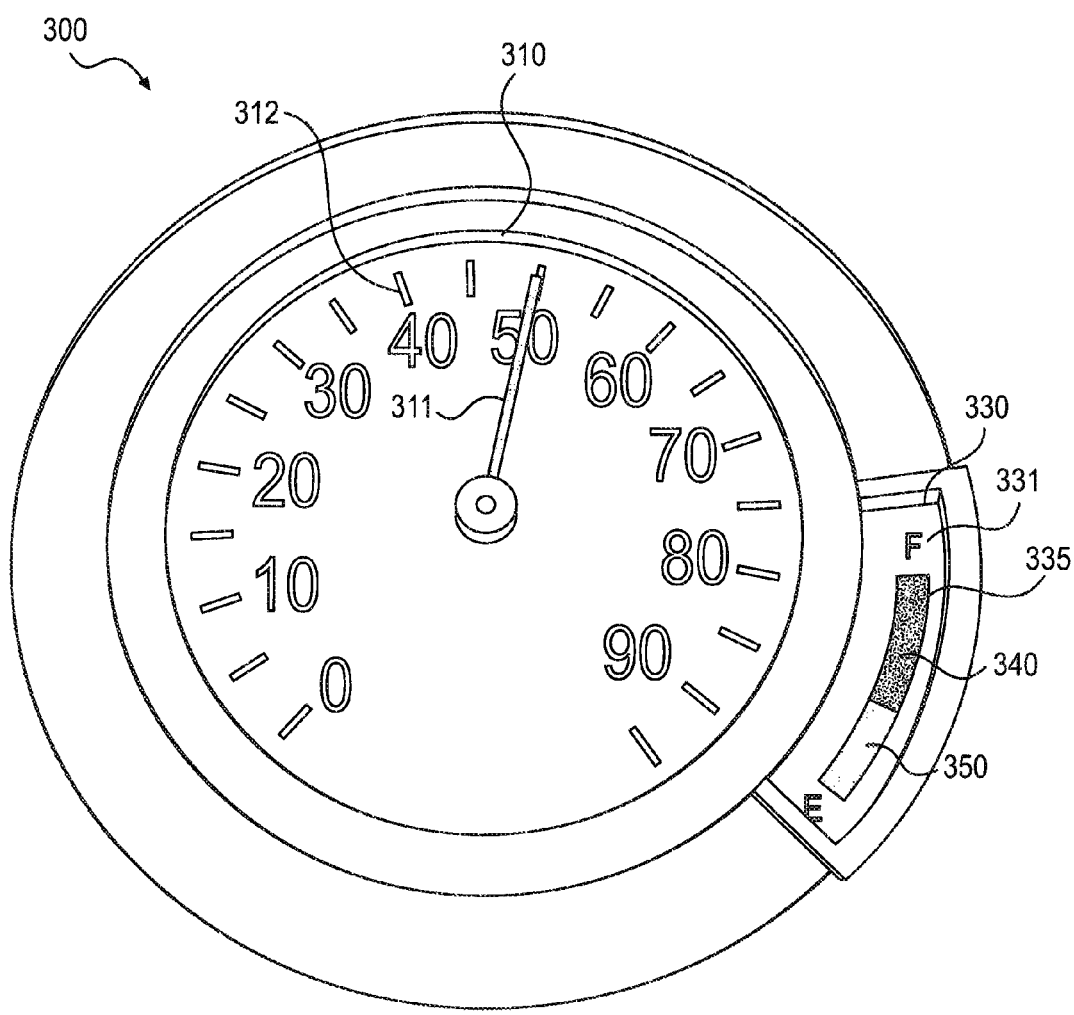

Referring to FIG. 4(b), the front-view of the instrument cluster portion 300 is shown with the applique 400 applied. The major contrast between FIG. 4(b) and FIG. 3 is that the pointer 200's stem 210 and pivot 220 are not shown, and the portions of the paddle 230 that are not encompassing the bar graph opening 340 are also not shown.

Not shown, the pointer 200 may be equipped with a counter weight to help balance the extra weight and size associated with the paddle 230.

Thus, employing the concepts disclosed herein, an instrument cluster may implement a mechanical driven bar graph indication. The aspects described herein illustrate an example of a speedometer and a fuel gauge combined together. However, various instrument cluster information displays may be substituted based on an implementer's preference.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

I claim:

1. An instrument cluster display, comprising:
a first surface facing a viewer of the instrument cluster, comprising:
    a first portion with a dial-based display;
    a second portion with a bar graph display; and
and a first pointer device and a second pointer device, the first pointer device and the second pointer device rotating around a same axis, the second pointer device comprising:
    a stem;
    a pivot portion integrally attached to a first side of the stem, and equipped to attach to a pointer driving mechanism; and
    a paddle attached to a second side of the stem;
    the paddle being wider than the stem in a first direction;
    wherein the second portion includes an opening to visibly display a portion of one of the paddle;
wherein the first portion and the second portion are each provided with a mechanically rotatable elements to indicate a present status, and
the first pointer device is disposed on the first surface of the instrument cluster, and the second pointer device is disposed on a second surface of the instrument cluster, the second surface opposing the first side.

* * * * *